Nov. 28, 1939.  V. W. HILLER  2,181,553
MILK COOLER
Filed Aug. 16, 1937  2 Sheets-Sheet 1
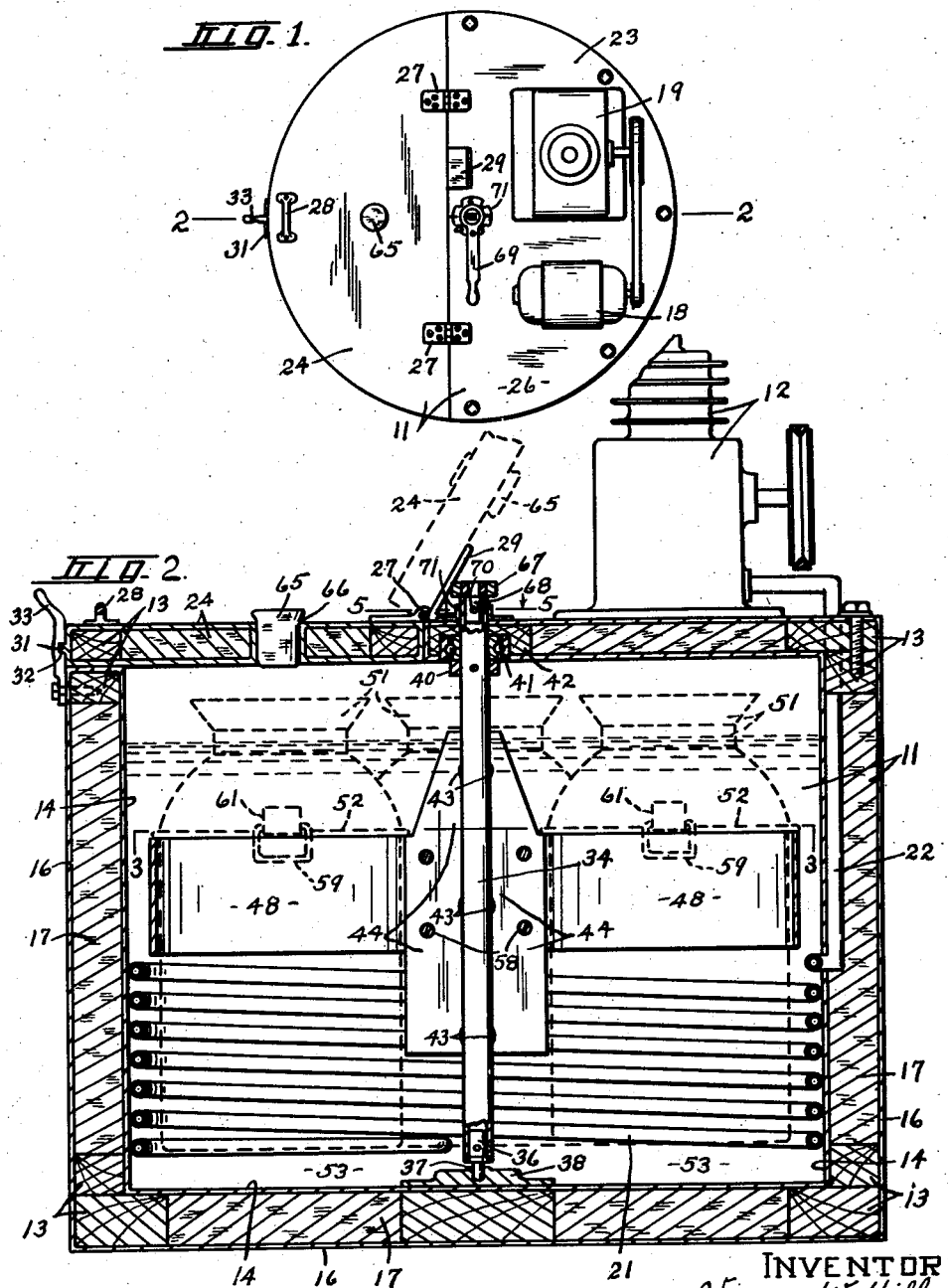
INVENTOR
Vernon W. Hiller
BY
Theodore E. Simonton
ATTORNEY Nov. 28, 1939.    V. W. HILLER    2,181,553
MILK COOLER
Filed Aug. 16, 1937    2 Sheets-Sheet 2
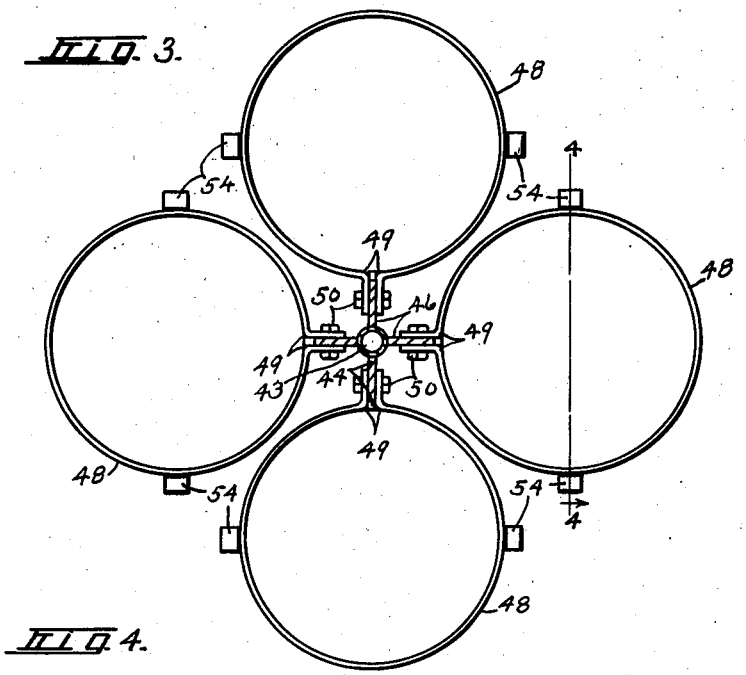
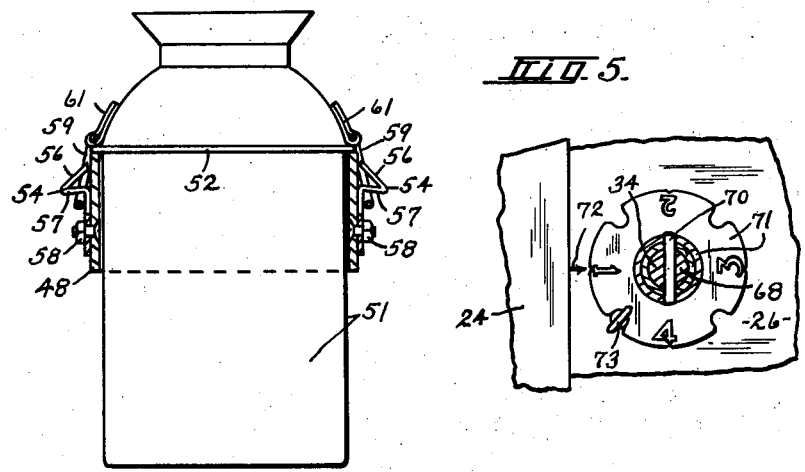
INVENTOR
Vernon W. Hiller
BY
Theodore E. Simonton
ATTORNEY Patented Nov. 28, 1939

2,181,553

UNITED STATES PATENT OFFICE 2,181,553

MILK COOLER

Vernon William Hiller, Clay, N. Y.

Application August 16, 1937, Serial No. 159,265

8 Claims. (Cl. 62—141)

My invention relates to milk coolers.

In the milk coolers of the prior art and now in general use it is customary to provide a vat having a suitable cooling liquid therein and to provide suitable apparatus for refrigerating the cooling liquid. Milk from the milking pails and at the temperature it is received from the cow is poured into large cans, of the type customarily employed in transporting bulk milk, which when full are lifted by the farmer and placed and substantially submerged, by reason of their weight, in the cooling vat. No means are employed for either circulating the cooling liquid or the milk within the cans. Consequently, considerable time is required to cool the milk which, when placed in the cooler is relatively warm. Moreover, the farmer is required to lift the large cans full of milk from the floor upon which the cooling vat stands and place them in the cooler, which operation requires considerable physical effort.

An additional disadvantage of the milk coolers of the prior art is that the cooling liquid within the vat is not retained at a constant level due to the fact that the level depends upon the number of cans of milk submerged in the cooling liquid. Moreover, the can is retained in a substantially submerged condition in the cooling liquid against the buoyant effect of the liquid and consequently difficulty is encountered in retaining a can only partially filled with milk in a submerged condition.

An object of my invention is to provide a milk cooler wherein means are employed for retaining empty milk cans in a submerged condition in the cooling liquid, thereby eliminating the necessity of the farmer lifting full cans of milk into the cooling vat.

Another object of my invention is the provision of a milk cooler wherein the cooling liquid is at all times maintained at a constant level and wherein only partly filled cans of milk may be retained in a substantially submerged condition.

A further object of my invention is to provide a milk cooler wherein means are employed for circulating the cooling liquid whereby the cooling liquid is maintained at a uniform temperature throughout and the cans of milk are cooled in a minimum length of time.

Still another object of my invention is the provision of means whereby both the cooling liquid and the milk within the cans are circulated so that the milk s cooled rapidly to the desired temperature.

More specifically, my invention contemplates the provision in a milk cooler of a unitary structure wherein the refrigerating coils are in such position and the cans are guided when they are placed in the cooler so that the coils cannot be bumped during the insertion of the milk cans in the cooler; the provision of means for retaining the milk cans substantially submerged when empty; the provision of means enabling the filling of the empty cans with milk when the cooling vat is closed; and the provision of means for circulating the cooling liquid, the cans and the milk within the cans to effect more rapid cooling of the milk.

Other objects and advantages of my invention will be more apparent from the following description, when taken in connection with the accompanying drawings, in which:

Figure 1 is a top plan view of a milk cooler in which my invention is embodied.

Figure 2 is a view taken on the line 2—2 of Figure 1 and indicating in dotted lines the milk cans in a substantially submerged condition.

Figure 3 is a view taken on line 3—3 of Figure 2 and showing the milk can holders.

Figure 4 is a view taken on the line 4—4 of Figure 3 showing the means by which the milk cans are retained in substantially submerged condition even when empty.

Figure 5 is a view taken on the line 5—5 of Figure 2.

The milk cooler of my invention comprises a cooling vat generally indicated by the numeral 11, and a refrigerating apparatus generally indicated by the numeral 12. The cooling vat 11 may be either square or circular in cross-section, as shown in the drawings, and includes a preferably wooden frame 13 the separate elements of which are suitably fastened together. The inside of the vat is covered with sheet metal 14 which may be galvanized or otherwise rendered rustproof. The outside of the vat may also be covered with sheet metal 16. Interposed between the inner and outer walls 14 and 16 insulation 17 is provided which may be cork or any other suitable insulating material.

The refrigerating apparatus may be of any conventional type, not necessary to be shown or described in detail herein. In general the refrigerating apparatus comprises a motor 18, a compressor 19 driven from the motor in any desired manner, and a cooling coil 21 located within the cooling vat through which by the compressor a suitable refrigerating fluid is circulated. The cooling coil is connected to the compressor by a pipe 22 which extends through the side wall of the vat, a suitable condenser and expansion valve (not shown) being provided, all in the manner well known in the art of refrigerating apparatus. The motor and compressor are shown as being mounted on the top 23 of the cooling vat, although if desired the motor and compressor may be mounted on the floor adjacent the vat.

A portion of the top of the vat is open, as shown in the drawings, and is closed by a suitable cover 24 hinged to a fixed portion 26 of the top by hinges 27. A handle grip 28 enables convenient opening of the cover and a stop 29 retains the cover when open in the inclined open position shown in Figure 2. The cover 24 may be locked in closed position by a suitable arcuate cam and handle arrangement indicated in Figure 2. An arcuate cam portion 31 is provided on the side edge of the cover which, when the cover is in locked position, lies in a slot 32 formed in a handle 33. When it is desired to unlock the cover, the handle is moved from the position shown until the cam portion 31 is free of the slot 32, after which the cover may be raised. When it is desired to lock the cover, the slot 32 is moved into registry with the arcuate cam 31 and the handle moved to the position shown in Figure 2, which cams the cover into tight engagement with the upper side wall of the vat.

A hollow shaft 34 extends downward through the fixed top portion 26 of the vat. The lower end of the shaft is closed by a plug 36 pinned to the shaft having a projecting end. The projecting end of the plug is seated in an opening 37 of a bearing plate 38 which is supported by a portion of the frame. The upper end of the shaft 34 is supported by a bearing 41 suitably mounted in the frame. A collar 40, pinned to the shaft, prevents upward movement of the shaft.

To the shaft 34 is welded, as indicated at 43, a bracket or spider, generally indicated by the numeral 44. The spider has four arms 46, although the number of arms will depend upon the number of cans of milk for which the cooler is built. Each of the arms 46 has secured thereto an annular ring 48. The ends of each of the annular rings are bent, as indicated at 49, and the bent portions straddle the arms 46 to which they are secured by nut and bolt assemblies 50. The large milk cans, such as that shown in Figure 4 and indicated generally by the numeral 51, in which milk is customarily transported are of standard diameter and the annular rings 48 are made of such diameter that they will loosely embrace the sides of the milk can. The top portion of the cylindrical part of the milk can is, in accordance with standard milk can construction, provided with a ledge 52. The ledge is adapted to engage the upper edge of the annular ring to support the milk can when full in spaced relation with the bottom of the vat, as indicated at 53. The annular rings not only serve to support the cans when full but also serve as guides to prevent the cans from striking the side walls of the vat or the coils when they are placed in the vat.

Each of the annular rings 48 is provided with a pair of brackets 54, each of which has a cam surface 56 and a hook part 57. The brackets 54 may be secured to the annular rings 48 as by nut and bolt assemblies 58. Milk cans of the type under discussion are provided with a pair of handles 59 which are loop shaped and which are retained in operative position on the can by U-shaped anchor straps 61. The handles 59 are free to rotate in the anchor straps so that they will normally lie down parallel to the sides of the can. The empty cans may be placed in the cooling vat by opening the cover and inserting the lower ends of the cans in the openings formed by the annular rings. Each of the cans is pushed downward into the cooling liquid against the buoyant effect thereof with the handles 59 in registry with the brackets 54. As the can is pushed downward the handles engage the cam parts 56 of the brackets and are raised upward and outward until they engage behind the hook parts 57 of the brackets. After all of the cans are in position the cover is closed and locked in position by means of the handle 33.

Upon starting the refrigerating unit the cooling liquid and the empty cans are cooled so that when the farmer is ready to pour the warm milk from the cows into the cans, the cans are already in a cooled condition. In order to pour the milk into the cans, the cork plug 65 which normally closes the opening 66 is pulled out and a funnel provided with a strainer substituted therefor. The farmer then pours each of the pails successively as they are received from milking into the funnel and thence into the milk cans. When one of the milk cans has been filled, the shaft 34 is rotated so as to bring another milk can below the opening 66.

Any suitable means may be provided for rotating the shaft 34 which may comprise a double acting ratchet. The ratchet comprises a ratchet gear 67 formed on the end of a plug 68 fitted in the end of the hollow shaft 34 and held in position by a pin 70. The gear 67 is adapted to be engaged by a ratchet pawl provided on the end of the handle 69. Through the ratchet the cans may be rotated in either direction. A dial 71 secured to the shaft 34 by the pin 70 shows, when in registry with a fixed mark 72 on the top of the vat, the can which lies below the opening 66 in a position to be filled. A removable locking pin 73, selectively engageable in one of a series of notches on the dial 71 and adapted to register in an opening in the fixed portion of the top of the cooler, retains the dial and consequently the cans in the desired position during filling.

Of particular importance in my milk cooler is the fact that the milk may be cooled more quickly than in the coolers of the prior art. Through the ratchet the milk cans may be rotated which causes agitation both of the cooling liquid and the milk in the cans. If desired, the gear 67 may be operated from the motor 19, although this is not necessary as only occasional rotation of the cans is necessary to stir up the cooling liquid and agitate the milk in the cans to effect the desired quick cooling. Also of importance is the fact that, since the cans are normally in the vat even when empty, the level of the cooling liquid is constant and since the cans can be placed in the cooling liquid when empty, the cans may be filled when in the cooler, thus eliminating the necessity of the farmer lifting full cans of milk into the cooler.

It will be apparent that various changes and modifications in the form and relation of the parts of my invention may be made without departing from the spirit thereof as set forth in the appended claims.

I claim:

1. A milk cooler comprising a vat, a coil of refrigerant containing pipes in said vat, said vat having a cooling liquid therein in contact with said coil, a rotatable support for milk cans within the vat, a cover for said vat which when open enables the insertion of milk cans into the vat, means extending from the rotatable support for engaging the cans and retaining them in a substantially submerged condition even when empty so that the cans may be placed in the vat when empty, means for enabling said cans to be filled when in said submerged condition, and means extending outside the vat to enable rotation of said support and cans to effect rapid cooling of the milk.

2. A milk cooler comprising a vat having insulated sidewalls, a coil of pipes in said vat, means for circulating a refrigerating medium through said coils, said vat having a cooling liquid therein in contact with said coil, a rotatable support for milk cans within the vat, a cover for said vat which when open enables the insertion of milk cans into the vat, means extending from the rotatable support for engaging the handles of the cans and retaining them in a substantially submerged condition even when empty so that the cans may be placed in the vat when empty, said vat having a top with an opening therein for enabling the cans to be filled when in said submerged condition, and means extending outside of the vat to enable rotation of said support and cans to effect rapid cooling of the milk.

3. A milk cooler comprising a vat adapted to contain a cooling liquid and to receive a plurality of milk cans having handles and having a ledge near the top of the side walls of the cans, a coil of pipes in said vat, means for circulating a refrigerating medium through said coils, a shaft mounted in said vat, a plurality of annular rings carried by said shaft, each of said annular rings being adapted to encompass the side walls of the can, a cover for said vat which when open enables a can to be inserted into the vat and to be pushed when empty into the cooling liquid and a respective ring against the buoyant effect of the liquid, means extending from said annular ring adapted to engage the handles of the can and retain the can when empty in a substantially submerged condition, means enabling the can to be filled with milk when the can is in said submerged condition, the ledge on the can engaging said annular ring when the can is full to support the can in spaced relation to the bottom of the vat, and means for rotating said shaft to rotate the cans and effect quick cooling of the milk.

4. A milk cooler comprising a vat adapted to contain cooling liquid and to receive a plurality of milk cans, a rotatable support within the vat, and can holding means carried by said support for engaging the cans and retaining them in a substantially submerged condition against the buoyant effect of the liquid when the cans are empty and to cause said cans to move in unison with the support during the rotation thereof.

5. A milk cooler comprising a vat adapted to contain a cooling liquid and to receive a milk can therein, a rotatable support for said can within the vat, means extending from said support for engaging the can and retaining it in a substantially submerged condition against the effect of the liquid when the can is empty, said vat having an inlet milk passage, and holding means associated with said support and with the vat coacting to releasably hold the support against rotation when the milk can is in registration with the milk passage for receiving the milk passing therethrough.

6. In a milk cooler comprising a cooling chamber provided with a cooling medium and adapted to receive a milk can therein, a support for said can mounted within said chamber for movement in a predetermined path therein, means for releasably connecting the milk can with the support to cause said can to move in unison therewith through the cooling medium, and means for moving said support through said path to effect rapid cooling of the milk.

7. A milk cooler comprising a vat adapted to receive a plurality of milk cans, means for cooling a liquid in the vat, a support for said cans within the vat and means extending from said support for engaging the cans and retaining them in a substantially submerged condition against the buoyant effect of the liquid when the cans are empty, said support being rotatably mounted, and means extending outside the vat for rotating the said support.

8. A milk cooler comprising a vat adapted to receive a plurality of milk cans, means for cooling a liquid in the vat, means for engaging such cans for retaining them in a substantially submerged condition even when empty, thereby maintaining the liquid in the vat at a constant level, means by which milk may be introduced into the cans while they are in the submerged condition, and means for circulating said cans in the vat.

VERNON WILLIAM HILLER.